July 20, 1937.   J. A. STREUN   2,087,390
HULLER FEEDER FOR COTTON
Filed April 7, 1936
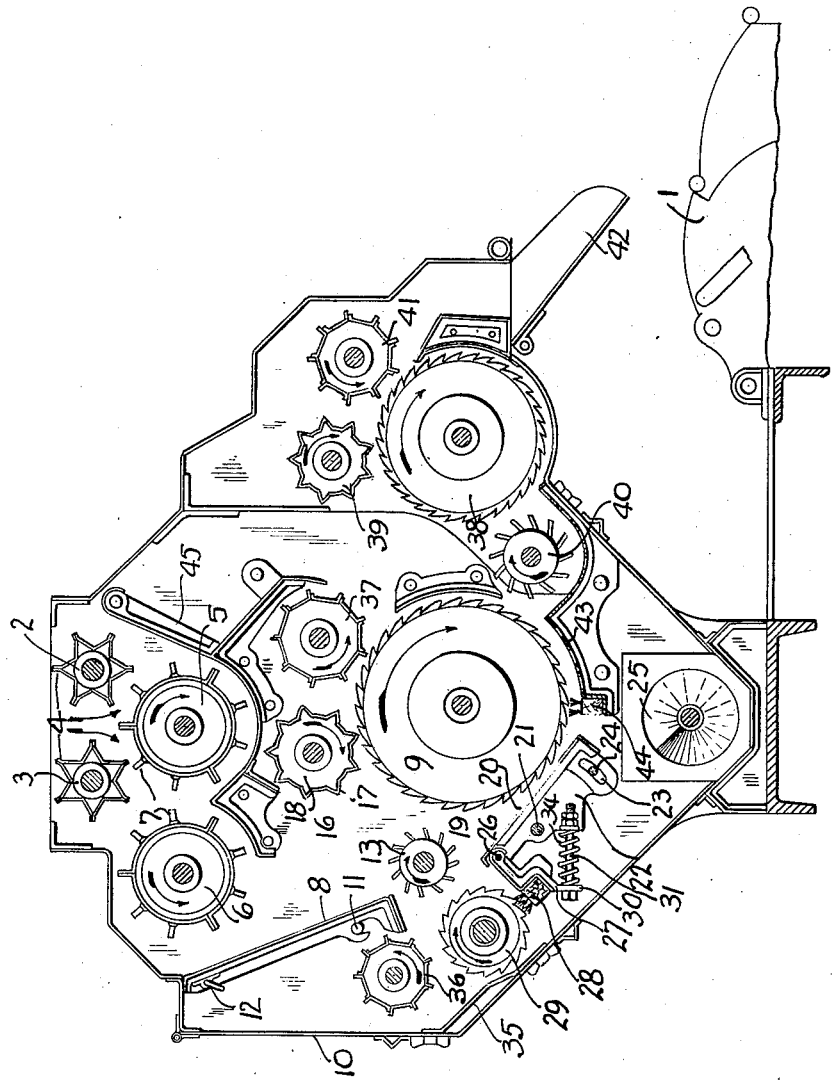
John Arnold Streun   INVENTOR.
BY Jesse R. Stone
Lester B. Clark
ATTORNEYS Patented July 20, 1937

2,087,390

UNITED STATES PATENT OFFICE 2,087,390

HULLER FEEDER FOR COTTON

John Arnold Streun, Sherman, Tex., assignor to Hardwicke-Etter Company, a corporation Application April 7, 1936, Serial No. 73,099

8 Claims. (Cl. 19—37)

The invention relates to apparatus for eliminating the hulls from seed cotton and feeding the seed cotton to the gin for ginning operations.

It is an object of the invention to provide an apparatus for effectively removing all of the lint from the hulls before the hulls are discharged from the machine.

I desire to submit the hulls to the action of the saws repeatedly before the hulls are eliminated, thus assuring that all of the lint is removed.

The invention resides particularly in the arrangement and construction of the devices which operate upon the cotton and hulls before the cotton is discharged to the gin.

Referring to the drawing herewith, I have shown a side view taken at the ends of the rollers with one side wall of the housing removed, the parts being in section at the ends of the rollers and through the shafts upon which the rollers are mounted.

The combination huller and feeder which is disclosed in the drawing is placed above the gin, the broken upper end of which is seen at 1. The cotton is received in the device at the top through a hopper or chute not shown. The cotton is received upon the upper sides of the two feeder rolls 2 and 3, mounted to rotate in the side walls of the housing in the usual manner. These feeder rolls have laterally extending flights 4, which receive the cotton and move it downwardly between the rolls as indicated by the arrows. These feeder rolls rotate at a comparatively slow rate of speed, feeding the cotton to the machine at the desired rate.

The cotton is received and acted upon by two adjacent agitator rolls 5 and 6. These rolls are mounted to rotate in the direction shown by the arrows, the roller 5 rotating in a clockwise direction and the roller 6 in a counter-clockwise direction as viewed in the drawing. The surface of these agitator rolls is formed with radially extending spikes 7, which engage the cotton coming from the feed rolls and carry it rapidly around the lower side of the roller 5 and over the upper side of the roller 6. The action of these two rollers is to break up the hulls somewhat and fluff the cotton so that when it is delivered to the saw rolls it will not be bunched together in lumps but will be loose and in better condition for the separation of the hulls from the lint.

From the two agitator rolls the cotton falls upon the hull board 8 which is inclined forwardly in the direction of the saw cylinder 9. This hull board is intended to be removable through a rear door 10 upon the housing. For this purpose it is supported at its lower end upon a pin 11 engaging within a notch in the end supports for the board. The upper end is latched at 12 by means of bolts which can be removed, thus allowing the hull board to be swung outwardly at the upper end and through the door and in that manner removed from the housing so as to allow access to the interior of the cleaner.

Below the end of the hull board 8 and directly to the rear of the saw cylinder 9 is a picker roll 13. This roll is of smaller diameter and has outwardly projecting pins thereon which are inclined rearwardly from the direction of rotation. This roller is rotated in a direction indicated by the arrow to carry the cotton and hulls toward the saw cylinder 9.

Said saw cylinder is mounted upon a shaft and rotates in a clockwise direction and the teeth are inclined forwardly in the direction of rotation. It will be seen, therefore, that the teeth of the saw cylinder will receive the cotton carried around by the picker roll 13 and will engage the lint of the cotton and carry the same around away from the roll and the chamber 16 above the roll.

Hulls which are caught with the lint and carried forwardly by the saw cylinder will be engaged by the flights 17 upon the knocker roll 18 positioned above and toward the rearward side of the saw cylinder. The hulls will be engaged by the knocker roll and thrown backwardly into the chamber 16 and away from the lint.

Hulls from which the lint is removed will pass downwardly through the space 19 between the picker roll and the saw cylinder and will engage upon the lower inclined hull board 20. This hull board is pivoted upon pins 21 at each end of the board and the lower ends of the side brackets 22 are formed with arcuate openings 23 which receive inwardly extending pins 24 upon the side walls of the housing. In this manner it will be seen that the board may be adjusted toward and away from the saw cylinder in such manner as to regulate the space between the board and the saws. In this manner the operator can adjust the hull board to allow the hulls to pass the saw cylinder downwardly to the lower end of the hull board to the lower conveyer 25.

Pivoted at 26 to the upper end of the hull board is a laterally extending plate 27 having secured thereto a brush member 28, the bristles of which extend radially toward the reclaiming saw cylinder 29. The plate 27 is recessed to receive the brush stick 28 and has at its lower end an inclined bracket 30 through which a rod or bolt 31 extends. The opposite end of the bolt extends through a plate attached to the arm 22 and is slidable therethrough. There is a coil spring 34 between the plate 30 and the arm 22 which holds the brush resiliently toward the reclaiming saw cylinder 29.

The reclaiming cylinder 29 rotates in a clockwise direction, as seen in the drawing, and has saw teeth thereon which are adapted to engage the lint from hulls passing over the upper plate 27 and carry the lint around to be engaged again by the picker roll and carried to the main saw cylinder 9. Hulls passing the brush 28 will move downwardly along the forward wall of the housing to the conveyer 25. There is a hull board 35 spaced closely adjacent the reclaiming cylinder which tends to prevent the passage upwardly of the hulls with the lint. The lint carried around by the reclaiming saw cylinder will be doffed by the doffer roll 36 and thrown forwardly against the picker roll 13 where it will be carried around to the main saw cylinder.

The lint on the main saw cylinder will be doffed therefrom by the brush or doffer roll 37 and thrown forwardly onto the auxiliary saw cylinder 38. There is a knocker roll 39 above the auxiliary cylinder which tends to remove the hulls on the lint which is engaged by the auxiliary cylinder and to throw the hulls rearwardly so that they will fall down upon the feed roll 40. The lint engaged by the auxiliary cylinder will be removed by the brush roll 41 and discharged downwardly through the chute 42 to the gins.

The hulls received by the feed roll 40 will be moved toward the auxiliary cylinder so that most of the lint will be removed but the hulls will be discharged over the perforated screen board 43, toward the main saw cylinder. It will be there engaged and carried around past the brush 44 to the space below the main saw cylinder from whence it will drop to the conveyer which will carry it from the housing. The action of the brush 44 is to hold the hulls yieldably toward the main saw cylinder so that all lint will be extracted therefrom before the hulls are eliminated.

It will be obvious that cotton acted upon by my huller device will be subjected to the action of the saw cylinders repeatedly in such manner that all lint which may be carried by the hulls will be removed therefrom before the hulls are eliminated. Furthermore, precaution is taken through the particular arrangement of the parts that no hulls will be carried with the lint to the gins. The quality of the cotton will be thereby greatly improved. Attention is called to the particular form of the hull board 20 which may be so adjusted as to allow hulls to pass between the same and the saw cylinder 9, but which will still enable the lint upon the hulls passing through this space to be effectively removed before the hulls are discharged. Hulls which are thrown up by the saw cylinder over the upper side of the hull board 20 will be again acted upon most effectively by the reclaiming saw cylinder 29, which will again engage such lint as is left upon the hulls and remove the said lint and carry it around again to the main saw cylinder and hulls which accompany the lint when delivered to the reclaiming cylinder can fall downwardly to the exit. The arrangement of the different elements acting upon the cotton and the hulls is particularly effective so that an improved quality of product results.

Where the cotton is fairly clean and little treatment thereof is desired, the cotton can be routed to travel directly to the auxiliary cylinder 38. This is done by opening a valve 45 adjacent the feed rolls and swinging said valve to a position closely adjacent the forward wall of the huller housing. In such case the hulls will be largely eliminated through the action of the auxiliary cylinder and its accompanying rolls. Hulls thus eliminated will follow the passage below feed roll 40 and the main saw cylinder 9 to the outlet. Less mechanical treatment of the cotton is desirable where the hulls are easily eliminated because the lint is less liable to be torn or otherwise broken, thus improving the quality of the cotton.

What is claimed as new is:

1. In a cotton hulling machine, a housing, a main saw cylinder rotatable therein, means to direct the hully cotton to said cylinder, a knocker roll and a brush roll adjacent said cylinder, a hull board adjacent the lower side of said cylinder and adjustable toward and away from said cylinder, a reclaiming cylinder spaced rearwardly of said hull board, resilient means to guide hulls from said saw cylinder against said reclaiming saw cylinder, means to doff said reclaiming cylinder, and means to convey said cotton from said doffing means to said main saw cylinder.

2. In a cotton hulling machine, a housing, a main saw cylinder rotatable therein, means to feed cotton to said housing, means to agitate and fluff said cotton, means to direct said cotton to said saw cylinder, a knocker roll and a brush roll adjacent said cylinder, a hull board adjacent the lower side of said cylinder and adjustable toward and away from said cylinder, a reclaiming cylinder spaced rearwardly of said hull board, resilient means to guide hulls from said saw cylinder against said reclaiming saw cylinder, means to doff said reclaiming cylinder, and means to convey said cotton from said doffing means to said main saw cylinder.

3. In a cotton hulling machine, a housing, a main saw cylinder rotatable therein, means to direct the hully cotton to said cylinder, a knocker roll and a brush roll adjacent said cylinder, a hull board adjacent the lower side of said cylinder and adjustable toward and away from said cylinder, a reclaiming cylinder spaced rearwardly of said hull board, resilient means to move hulls from said saw cylinder against said reclaiming saw cylinder, means to doff said reclaiming cylinder, an auxiliary saw cylinder spaced forwardly from said main saw cylinder to receive cotton therefrom, means to guide hulls from said auxiliary saw cylinder beneath said main saw cylinder, and means to convey said cotton from said doffing means to said main saw cylinder.

4. In a cotton hulling machine the combination of a saw cylinder, a knocker roll and a brush roll adjacent thereto, a picker roll rearwardly of said saw cylinder rotatable in the same direction as said cylinder, a hull board adjustable to receive cotton and hulls from said picker roll and guide them toward said saw cylinder, an outlet for hulls below said cylinder, means to remove lint from hulls kicked over said hull board by said saw cylinder and a means to move said lint back to said picker roll.

5. In a cotton hulling machine, a main saw cylinder, means to receive and fluff the cotton, means to direct said cotton to said saw cylinder, an adjustable hull board adjacent the lower side of said saw cylinder, a brush below said cylinder, an outlet between said hull board and said brush, a reclaiming cylinder spaced to receive hulls and lint knocked over said hull board by said saw cylinder, a brush adjacent the lower side of said reclaiming cylinder, resilient means to support said brush, means to doff lint from said reclaiming cylinder, and means to receive said lint and move it to said saw cylinder.

6. In a cotton hulling machine, a main saw cylinder, means to receive and fluff the cotton, means to direct said cotton to said saw cylinder, an adjustable hull board adjacent the lower side of said saw cylinder, a brush below said cylinder, an outlet between said hull board and said brush, an auxiliary saw cylinder spaced forwardly from said main saw cylinder, means to move hulls from said auxiliary saw cylinder below said main saw cylinder to said outlet, a reclaiming cylinder spaced to receive hulls and lint knocked over said hull board by said saw cylinder, a brush adjacent the lower side of said reclaiming cylinder, resilient means to support said brush, means to doff lint from said reclaiming cylinder, and means to receive said lint and move it to said saw cylinder.

7. In a cotton huller, the combination with a main saw cylinder of means to direct cotton and hulls thereto, means to doff cotton therefrom, an inclined hull board adjacent the lower side of said cylinder, a reclaiming saw cylinder, a resiliently mounted board pivoted above said hull board to guide hulls from said main saw cylinder to said reclaiming cylinder, and means to move cotton from said reclaiming cylinder to said main saw cylinder.

8. In a cotton hulling machine, a main saw cylinder, means to feed cotton thereto, a reclaiming saw cylinder spaced therefrom, a hull board inclined downwardly to a point spaced beneath said main saw cylinder, a deflecting plate pivoted adjacent the upper end of said hull board, resilient means to hold said plate upwardly, a brush on said plate beneath said reclaiming cylinder to press said hulls against said reclaiming cylinder and means to pass lint from said reclaiming cylinder to said main saw cylinder.

JOHN ARNOLD STREUN.